US010434732B2

(12) United States Patent
Naruse

(10) Patent No.: US 10,434,732 B2
(45) Date of Patent: *Oct. 8, 2019

(54) FLAT TIRE REPAIR LIQUID CONTAINER

(71) Applicant: The Yokohama Rubber Co., LTD., Minato-ku, Tokyo (JP)

(72) Inventor: Masahiro Naruse, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 307 days.

This patent is subject to a terminal disclaimer.

(21) Appl. No.: 15/304,412

(22) PCT Filed: Apr. 10, 2015

(86) PCT No.: PCT/JP2015/061272
§ 371 (c)(1),
(2) Date: Oct. 14, 2016

(87) PCT Pub. No.: WO2015/159828
PCT Pub. Date: Oct. 22, 2015

(65) Prior Publication Data
US 2017/0043545 A1    Feb. 16, 2017

(30) Foreign Application Priority Data

Apr. 16, 2014  (JP) ................................. 2014-084523

(51) Int. Cl.
*B29C 73/02* (2006.01)
*B29C 73/16* (2006.01)
(Continued)

(52) U.S. Cl.
CPC ............ *B29C 73/166* (2013.01); *B65D 41/28* (2013.01); *B65D 47/121* (2013.01); *B65D 53/02* (2013.01); *B29L 2030/00* (2013.01); *B60S 5/04* (2013.01)

(58) Field of Classification Search
CPC .... B29C 73/166; B65D 53/02; B65D 47/121; B65D 41/28; B29L 2030/00; B60S 5/04
See application file for complete search history.

(56) References Cited

U.S. PATENT DOCUMENTS 6,454,892 B1 * 9/2002 Gerresheim .......... B29C 73/163
152/503
6,964,284 B2 * 11/2005 Eckhardt ............... B29C 73/166
141/100
(Continued)

FOREIGN PATENT DOCUMENTS

JP   2009-507682   2/2009
JP   2010-167742   8/2010
(Continued)

OTHER PUBLICATIONS

International Search Report for International Application No. PCT/JP2015/061272 dated May 19, 2015, 7 pages, Japan.

*Primary Examiner* — Nicolas A Arnett
(74) *Attorney, Agent, or Firm* — Thorpe North & Western

(57) ABSTRACT

A flat tire repair liquid container is provided with: a closing stopper, which is formed from a non-elastomer material and is capable of sliding inside a flow channel; and a sealing member, which is formed from an elastomer material, is disposed in a ring shape conforming to an inner wall surface of a flow channel, closes a gap between the closing stopper and the flow channel, and holds the closing stopper at a predetermined position. During storage, the closing stopper is engaged with the sealing member to close the flow channel. During flat tire repair work, the closing stopper is pushed out from the sealing member by pressure inside the container and moved toward the outer side of the container in the flow channel to open the flow channel.

12 Claims, 8 Drawing Sheets

(51) Int. Cl.
  *B65D 41/28* (2006.01)
  *B65D 47/12* (2006.01)
  *B65D 53/02* (2006.01)
  *B60S 5/04* (2006.01)
  *B29L 30/00* (2006.01)

(56) References Cited

U.S. PATENT DOCUMENTS

| | | | | |
|---|---|---|---|---|
| 8,205,645 | B2* | 6/2012 | Dowel | B29C 73/166 |
| | | | | 141/38 |
| 8,302,636 | B2* | 11/2012 | Sekiguchi | B29C 73/166 |
| | | | | 141/100 |
| 8,640,745 | B2* | 2/2014 | Ji | B29C 73/166 |
| | | | | 141/105 |
| 8,746,293 | B2* | 6/2014 | Chou | B60S 5/04 |
| | | | | 141/38 |
| 8,978,716 | B2* | 3/2015 | Chou | B60S 5/043 |
| | | | | 137/231 |
| 9,193,229 | B2* | 11/2015 | Hong | B29C 73/166 |
| 9,333,715 | B2* | 5/2016 | Kono | B29C 73/166 |
| 10,086,574 | B2* | 10/2018 | Sekiguchi | B29C 73/166 |
| 2008/0264540 | A1* | 10/2008 | Dowel | B29C 73/166 |
| | | | | 152/509 |
| 2009/0107578 | A1* | 4/2009 | Trachtenberg | B05B 9/0805 |
| | | | | 141/5 |
| 2009/0277534 | A1* | 11/2009 | Yoshida | B29C 73/166 |
| | | | | 141/38 |
| 2013/0068346 | A1 | 3/2013 | Ji | |
| 2014/0224380 | A1 | 8/2014 | Kono | |

FOREIGN PATENT DOCUMENTS

| | | |
|---|---|---|
| JP | 2013-067161 | 4/2013 |
| JP | 3189236 | 2/2014 |
| WO | WO 2007030896 | 3/2007 |
| WO | WO 2013-040880 | 3/2013 |
| WO | WO 2013/047420 | 4/2013 |

* cited by examiner

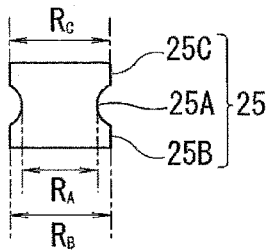
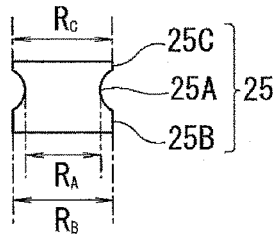
FIG. 4A  FIG. 4B
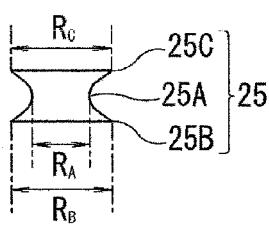
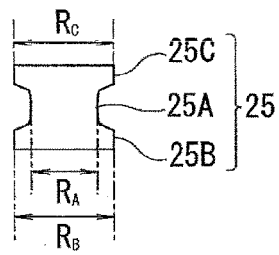
FIG. 4C  FIG. 4D
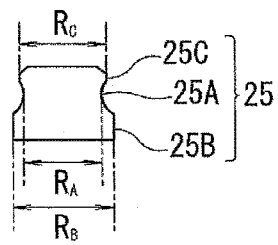
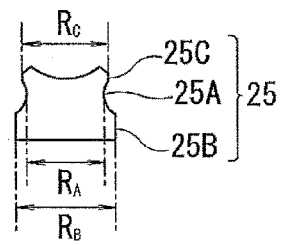
FIG. 4E  FIG. 4F
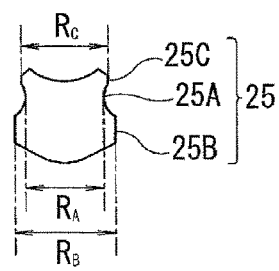
FIG. 4G

FLAT TIRE REPAIR LIQUID CONTAINER

TECHNICAL FIELD

The present technology relates to a flat tire repair liquid container, and more particularly relates to a flat tire repair liquid container that makes it possible to prevent liquid leakage during storage and prevent flow channel opening problems.

BACKGROUND ART

In recent years, when a tire mounted to a vehicle is punctured, flat tire repair liquid is injected into the tire via the tire valve to temporarily repair the puncture.

For example, a flat tire repair kit that is configured to supply flat tire repair liquid stored in the flat tire repair liquid container to the interior of the tire via a tube is employed as an injection device for such flat tire repair liquid. Employing such a flat tire repair kit eliminates the need to provide the vehicle with a spare tire, which makes it possible to save resources and reduce the weight of the vehicle. There is a further advantage that the space in the vehicle where the spare tire would have been provided can be used for other purposes.

A flat tire repair liquid container includes, for example, a container main body including a container body storing a flat tire repair liquid and an opening, and a cap including a mounting portion mounted to the opening during flat tire repair work, a dispensing portion that dispenses the flat tire repair liquid outside of the container, and a flow channel that connects the mounting portion and the dispensing portion. In such a configuration, providing a closing stopper formed from rubber in the flow channel has been proposed as a way of preventing the flat tire repair liquid from leaking out from the flow channel during storage (see Japanese Unexamined Patent Application Publication No. 2013-067161, for example).

With the closing stopper proposed in Japanese Unexamined Patent Application Publication No. 2013-067161, the flow channel is opened by pressure of air supplied to the interior of the container during flat tire repair work that moves the closing stopper within the flow channel to a predetermined position (an end of the flow channel positioned toward the outer side of the container). However, the closing stopper formed from rubber deforms easily, and there is thus a problem that the closing stopper deforms under the pressure of the air when moving within the flow channel, becomes stuck partway along the flow channel and block the flow channel, and prevent the flow channel from opening correctly (in other words, an opening problem occurs). Such a rubber-formed closing stopper is prone to dimensional variations during molding, which causes a problem in that if the diameter of the closing stopper is too much greater than a desired dimension, the closing stopper cannot move smoothly within the flow channel and will cause opening problems, whereas if the diameter of the closing stopper is too much smaller, the closing stopper cannot sufficiently prevent the flat tire repair liquid from leaking.

SUMMARY

The present technology provides a flat tire repair liquid container that makes it possible to prevent liquid leakage during storage and prevent flow path opening problems.

A flat tire repair liquid container of the present technology includes:

a container main body including a container body and an opening, the container body storing a flat tire repair liquid; a cap including a mounting portion, a dispensing portion, and a flow channel, the mounting portion being mounted to the opening during flat tire repair work, the dispensing portion being configured to dispense the flat tire repair liquid outside of the container, the flow channel connecting the mounting portion and the dispensing portion; a closing stopper formed from a non-elastomer material, the closing stopper being capable of sliding within the flow channel; and a sealing member formed from an elastomer material, the sealing member being disposed in a ring shape conforming to an inner wall surface of the flow channel and configured to close a gap between the closing stopper and the flow channel and to hold the closing stopper at a predetermined position. In such a flat tire repair liquid container, during storage, the closing stopper and the sealing member engage with one another to close the flow channel, and during flat tire repair work, the closing stopper is pushed out from the sealing member by pressure inside the container and moved toward an outer side of the housing container in the flow channel to open the flow channel.

In the present technology, as described above, the closing stopper, which is formed from a non-elastomer material, and the sealing member, which is formed from an elastomer, is employed as a means for closing the flow channel during storage in order to prevent liquid leakage. Forming the closing stopper from the non-elastomer material makes it easy to form the closing stopper in a predetermined shape, and dimensional variations arising in the closing stopper during molding can be suppressed. Accordingly, liquid leakage during storage and opening problems in the flow channel can be prevented. Furthermore, by forming the closing stopper from non-elastomer material, the closing stopper can be prevented from deforming under pressure exerted thereon when moving within the flow channel, which makes it possible for the flow channel to open with certainty without the closing stopper becoming stuck partway along the flow channel.

In the present technology, it is preferable that the closing stopper include a recessed portion that engages with the sealing member, a diameter $R_A$ of the recessed portion be smaller than a diameter $R_B$ of an end of the closing stopper positioned toward the outer side of the container and a diameter $R_C$ of an end of the closing stopper positioned toward the inner side of the container, and the diameter $R_A$ be greater than an inner diameter r of the sealing member. Setting the shape of the recessed portion of the closing stopper in this manner makes it possible for the closing stopper to securely engage with the sealing member during storage, which makes it possible to effectively prevent liquid leakage.

In the present technology, it is preferable that the flow channel include a vertical hole section extending in a sliding direction of the closing stopper and a horizontal hole section extending in a direction that intersects with the vertical hole section, and during flat tire repair work, the end of the closing stopper positioned toward the inner side of the container be located on the outer side of the container with respect to a center of the horizontal hole section. Such a configuration makes it possible to sufficiently ensure that the flat tire repair liquid flows through the flow channel when open.

This configuration also preferably includes a housing portion that houses the closing stopper during flat tire repair work provided on an end of the vertical hole section positioned toward the outer side of the container. Such a configuration allows the flow channel to be sufficiently and more reliably ensured.

In the present technology, it is preferable that the flat tire repair liquid container further include a guide for moving the closing stopper parallel to the flow channel. Such a configuration allows the closing stopper to move smoothly and can prevent problems such as the closing stopper becoming inclined in the flow channel during movement and clogging the flow channel.

In the present technology, it is preferable that upon pressure inside the container reaching 150 kPa or higher, the closing stopper be pushed out from the sealing member and moved toward the outer side of the container in the flow channel. Such a configuration allows the flow channel to be reliably closed during storage and easily opened during flat tire repair work.

A method for injecting flat tire repair liquid using the flat tire repair liquid container described above includes:

connecting the flat tire repair liquid container to a compressor; and pressurizing the inside of the container to 150 kPa or higher such that the closing stopper is pushed out from the sealing member and moved toward the outer side of the container in the flow channel to open the flow channel.

BRIEF DESCRIPTION OF DRAWINGS

FIGS. 4A to 4G are cross-sectional views illustrating modified examples of the closing stopper.

DETAILED DESCRIPTION

A configuration of the present technology will be described below in detail with reference to the accompanying drawings.

Figure 1:
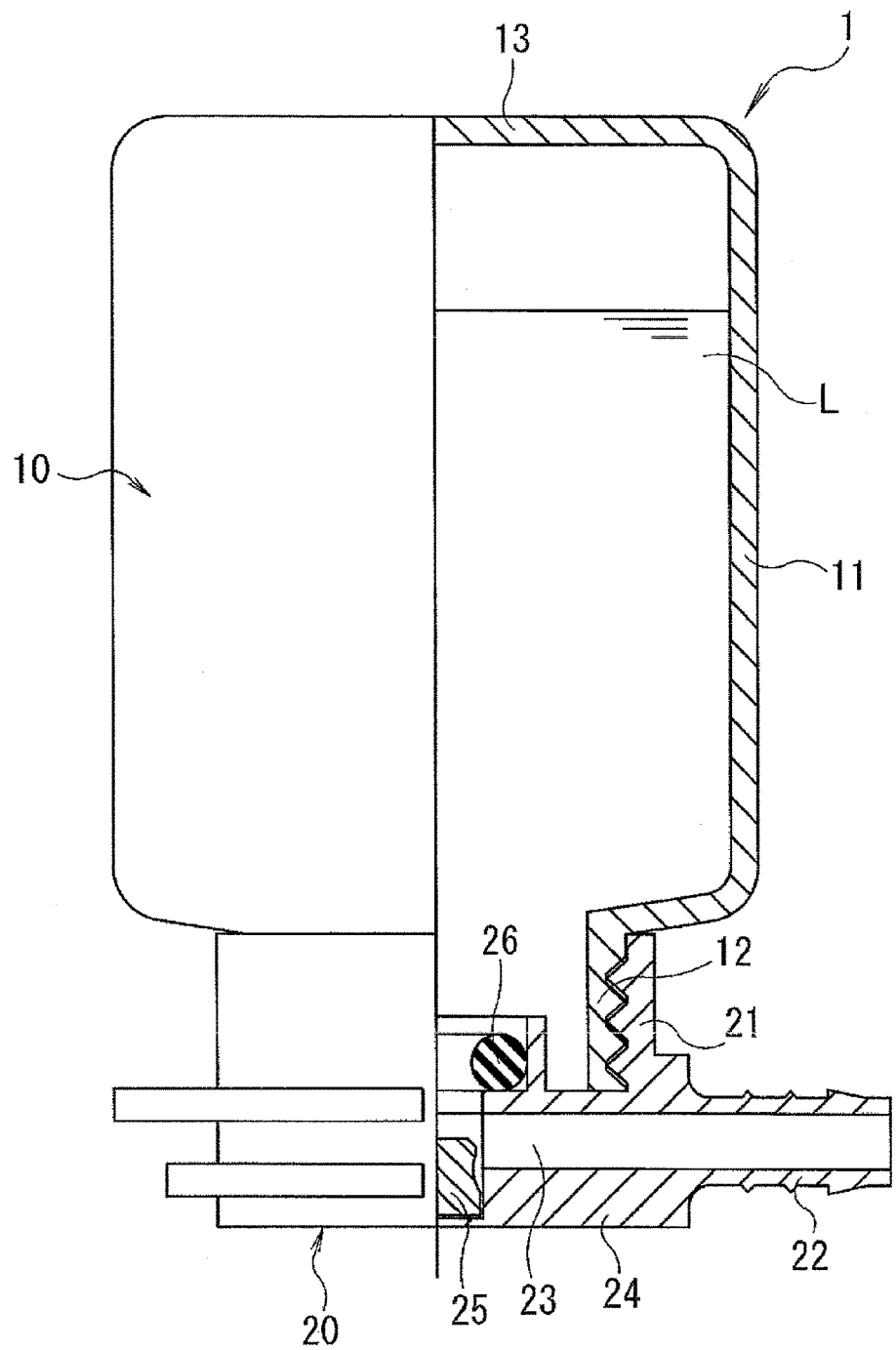
FIG. 1 is a partially cut-out front view of a flat tire repair liquid container according to the present technology.

As illustrated in FIG. 1, a flat tire repair liquid container 1 (called a "container 1" hereinafter) according to the present technology is constituted of a container main body 10 and a cap 20.

The container main body 10 includes a cylindrical container body 11 storing flat tire repair liquid L (called "repair liquid L" hereinafter) that contains, for example, rubber latex, and a cylindrical opening 12 that is positioned on a lower side of the container body 11 when the container main body 10 is inverted and through which the repair liquid L is dispensed during use. When the container 1 is inverted, a bottom 13 of the container body 11 is positioned on a side opposite the opening 12. The opening 12 is sealed by a film (not illustrated). In this embodiment, a screw thread is formed on the outer surface of the opening 12 so as to mate with a screw thread on the cap 20, which will be described later. The container body 11, the opening 12, and the bottom 13 are integrally formed from, for example, a synthetic resin such as polyethylene.

Figure 2:
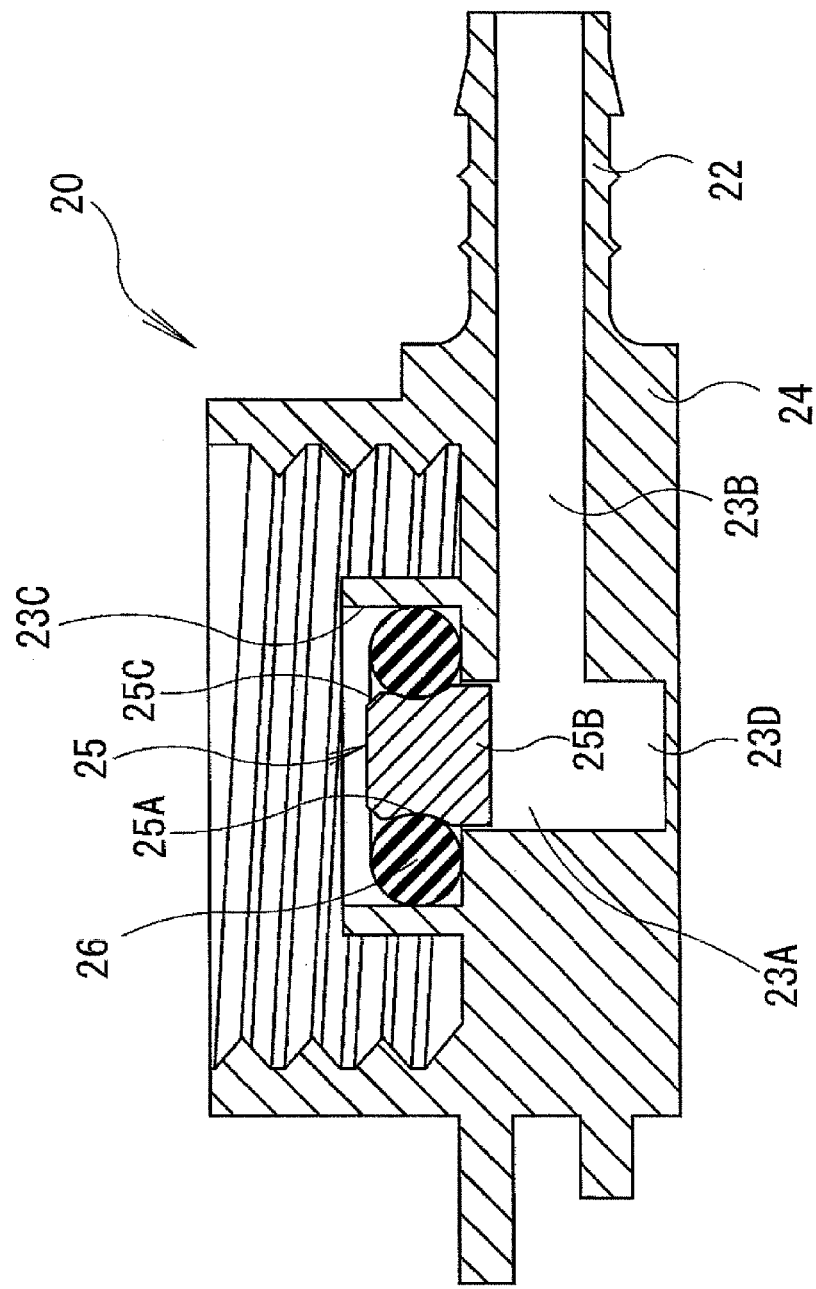
FIG. 2 is an enlarged cross-sectional view illustrating a cap (when a valve is closed) included in the flat tire repair liquid container illustrated in FIG. 1.
Figure 3:
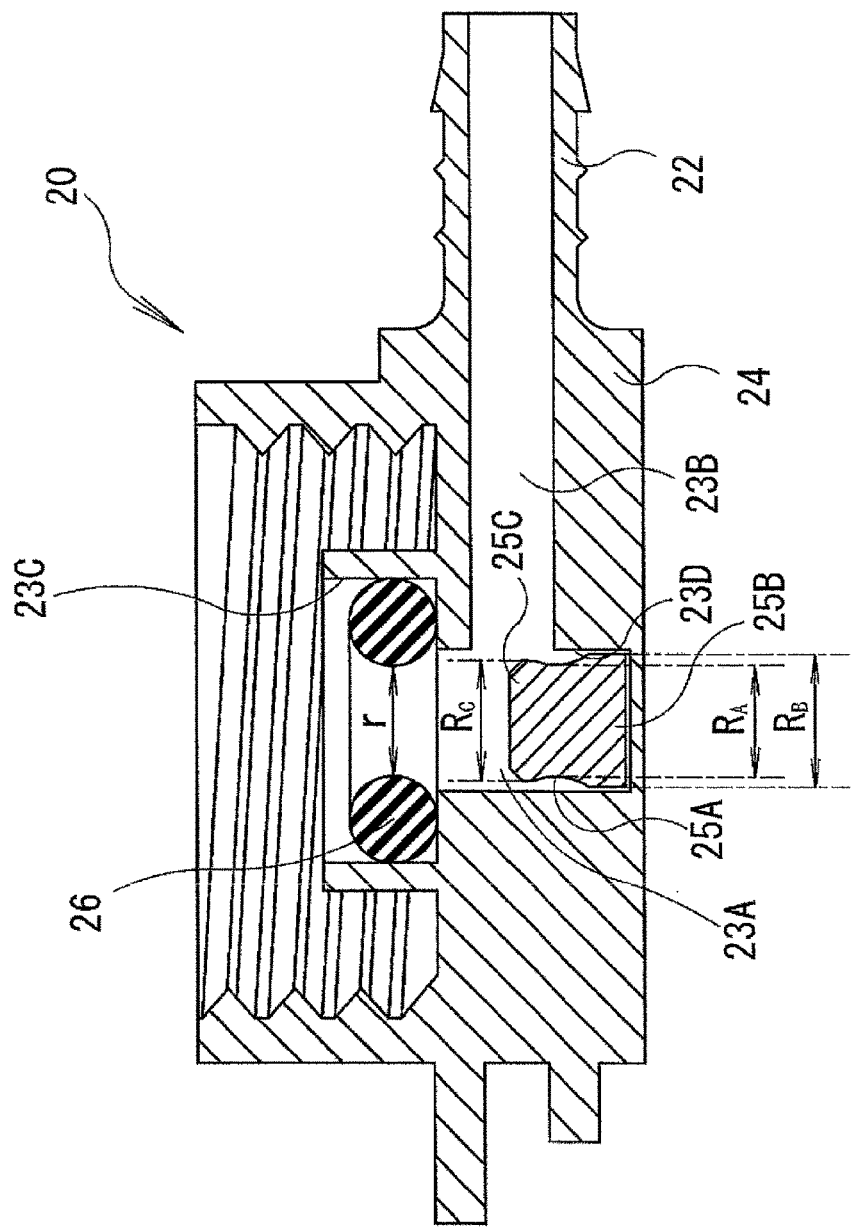
FIG. 3 is an enlarged cross-sectional view illustrating the cap (when the valve is open) included in the flat tire repair liquid container illustrated in FIG. 1.

As illustrated in an enlarged manner in FIGS. 2 and 3, the cap 20 includes a mounting portion 21 that is mounted to the opening 12 of the container main body 10 during flat tire repair work, a dispensing portion 22 that dispenses the repair liquid L outside of the container, and a flow channel 23 that connects the mounting portion 21 and the dispensing portion 22. The mounting portion 21 has a cylindrical shape, in the inner circumferential surface of which is formed a screw thread that mates with the screw thread in the opening 12 of the container main body 10. In the embodiment illustrated in the drawings, a base portion 24 having a cylindrical shape of the same diameter as the mounting portion 21 is formed integrally with the mounting portion 21. The dispensing portion 22 projects from a side surface of the base portion 24, and the flow channel 23 penetrates into the base portion 24. The flow channel 23 has a vertical hole section 23A extending in an axial direction of the cap 20 from a plane in the base portion 24 positioned toward the mounting portion 21, and a horizontal hole section 23B extending in a direction that intersects with the vertical hole section 23A and connecting to the dispensing portion 22.

In the present technology, a stopping mechanism constituted of a closing stopper 25 and a sealing member 26 is provided in the flow channel 23, particularly in the vertical hole section 23A. The closing stopper 25 is formed from a non-elastomer material, is configured to be capable of sliding within the flow channel 23 (the vertical hole section 23A), and engages in a hole part of the annular-shaped sealing member 26, which will be described later, when closed. Examples of non-elastomer material include resin, metal, and the like. The sealing member 26 is formed from an elastomer material and is disposed in a ring shape conforming to an inner wall surface of the flow channel 23 (the vertical hole section 23A). During storage, the sealing member 26 blocks a gap between the closing stopper 25 and the flow channel 23 (the vertical hole section 23A), and holds the closing stopper 25 in a predetermined position. Examples of elastomer material include rubber, thermosetting resin, and the like. In the example illustrated in the drawings, an expanded portion 23C that extends toward the inner side of the container from the base portion 24 and that has an inner diameter greater than other portions of the flow channel 23 (the vertical hole section 23A) is provided at the end of the flow channel 23 (the vertical hole section 23A) positioned toward the inner side of the container. The sealing member 26 is fitted into the expanded portion 23C.

The stopping mechanism constituted of the closing stopper 25 and the sealing member 26 engages the closing stopper 25 and the sealing member 26 together to close the flow channel 23 (the vertical hole section 23A) during storage, as illustrated in FIG. 2. During flat tire repair work, the compressor (not illustrated) supplies air to the interior of the container, and this pressure pushes the closing stopper 25 out from the sealing member 26 and moves the sealing member 26 toward the outer side of the container in the flow channel 23 (the vertical hole section 23A) to open the flow channel 23.

In such a manner, the stopping mechanism constituted of the closing stopper 25, which is formed from a non-elastomer material, and the sealing member 26, which is formed from an elastomer, is employed as a means for closing the flow channel 23 during storage in order to prevent liquid leakage. Forming the closing stopper 25 from the non-elastomer material makes it easy to form the closing stopper 25 in a predetermined shape, and dimensional variations arising in the closing stopper 25 during molding can be suppressed. Accordingly, liquid leakage during storage can be effectively prevented and opening problems in the flow channel 23 can be prevented. Furthermore, by forming the closing stopper 25 from a non-elastomer material, the closing stopper 25 can be prevented from deforming under pressure exerted thereon when moving within the flow channel 23, which makes it possible for the flow channel 23 to open with certainty without the closing stopper 25 becoming stuck partway along the flow channel 23.

The form of the closing stopper 25 is exemplified by the examples illustrated in FIG. 4A to FIG. 4G. As is shared by all the examples of FIG. 4A to FIG. 4G, the closing stopper 25 preferably includes a recessed portion 25A that engages with the sealing member 26. In other words, it is preferable that a diameter $R_A$ of the recessed portion 25A be smaller than a diameter $R_B$ of the portion positioned toward the outer side of the container with respect to the recessed portion 25A (called "outer portion 25B" hereinafter) and a diameter $R_C$ of the portion positioned toward the inner side of the container with respect to the recessed portion 25A (called "inner portion 25C" hereinafter). Additionally, when the recessed portion 25A is provided, it is preferable that the diameter $R_A$ of the recessed portion 25A be greater than an inner diameter r of the sealing member 26, as illustrated in FIG. 3. In other words, it is preferable that the diameters $R_A$, $R_B$, $R_C$, and r be set so as to satisfy the relationship $R_B$, $R_C > R_A > r$. Providing the closing stopper 25 with the recessed portion 25A and setting the diameters of the portions in this manner makes it possible for the closing stopper 25 to securely engage with the sealing member 26 during storage, which makes it possible to effectively prevent liquid leakage.

FIG. 4A illustrates an example in which an arcuate, when viewed in a cross-section, recessed portion 25A is formed, the outer portion 25B and the inner portion 25C have the same diameter, and the thickness of the outer portion 25B and the inner portion 25C is approximately equal. FIG. 4B illustrates an example in which an arcuate, when viewed in a cross-section, recessed portion 25A is formed and the outer portion 25B and the inner portion 25C have the same diameter, but the thickness of the outer portion 25B is greater than the thickness of the inner portion 25C. FIG. 4C illustrates an example in which an arcuate, when viewed in a cross-section, recessed portion 25A is formed and the outer portion 25B and the inner portion 25C have the same diameter, but the thickness of the outer portion 25B and the inner portion 25C is approximately zero (in other words, the closing stopper 25 is recessed all along its side). FIG. 4D illustrates an example in which a substantially trapezoidal, when viewed in a cross-section, recessed portion 25A is formed instead of the arcuate, when viewed in a cross-section, recessed portion 25A of FIG. 4A.

FIG. 4E illustrates an example in which the closing stopper 25 used in the embodiments of FIGS. 1 to 3 is enlarged. In this example, the diameter $R_B$ of the outer portion 25B is greater than the diameter $R_C$ of the inner portion 25C. In other words, the diameters $R_B$ and $R_C$ satisfy the relationship $R_B > R_C$. Furthermore, the side of the inner portion 25C is inclined, the diameter decreases toward the outer side of the container, and the circumferential portion of the end surface of the inner portion 25C is chamfered. Setting the diameter $R_C$ of the inner portion smaller than the diameter $R_B$ of the outer portion reduces the diameter of the closing stopper 25 on the side which comes into contact with the repair liquid L when open, as illustrated in FIG. 3, which is beneficial for sufficiently ensuring the flow channel 23.

Note that when a formula for the size relationship of the diameters of the portions described above is combined with the above-described size relationship, it is preferable, in the present technology, that the diameters $R_A$, $R_B$, $R_C$, and r of the respective portions be set to satisfy the relationship $R_B \geq R_C > R_A > r$.

FIG. 4F illustrates an example in which the closing stopper 25 of FIG. 4E has the inner portion 25C with an end surface recessed toward the outer side of the container. Forming the end surface with such a shape facilitates the catching of air by the closing stopper 25 allowing the air pressure to efficiently act upon the closing stopper 25, which is beneficial for providing smooth movement of the closing stopper 25. FIG. 4G illustrates an example in which the closing stopper 25 of FIG. 4F has the outer portion 25B with an end surface protruding toward the outer side of the container. Forming the end surface with such a shape makes it possible for air remaining in the flow channel 23 (the vertical hole section 23A) to escape effectively, which is beneficial for ensuring smooth movement of the closing stopper 25.

The thickness of the closing stopper 25 is not particularly limited. During flat tire repair work, the end surface of the inner portion 25C of the closing stopper 25 is preferably located on the outer side of the container with respect to the center of the horizontal hole section 23B. Such a configuration makes it possible to sufficiently ensure that the repair liquid L flows through the flow channel 23 when open. However, when the thickness of the closing stopper 25 itself is too small, the closing stopper 25 cannot be provided with sufficient strength. Thus, a configuration is preferable in which a housing portion 23D that houses the closing stopper 25 during flat tire repair work is provided on the end of the vertical hole section 23A positioned toward the outer side of the container. Such a configuration allows the thickness of the closing stopper 25 to be sufficiently ensured while also ensuring a sufficient flow channel 23.

Figure 5:
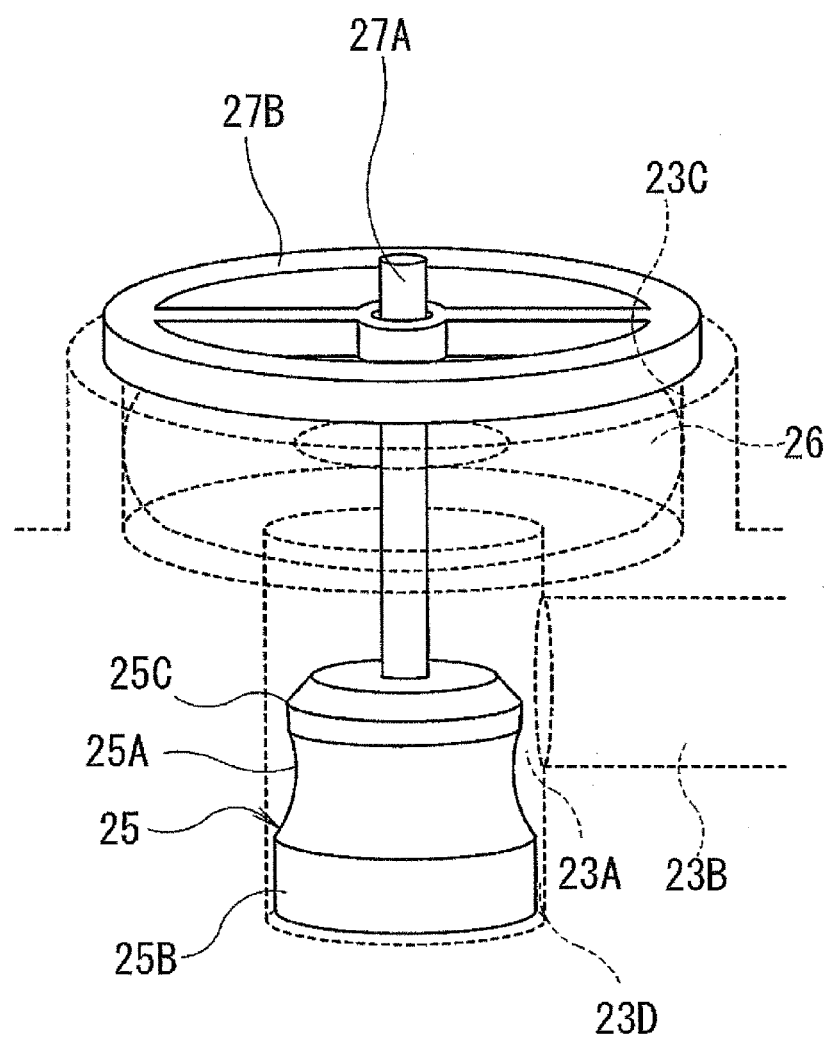
FIG. 5 is an explanatory view illustrating a structure of a guide.
Figure 6:
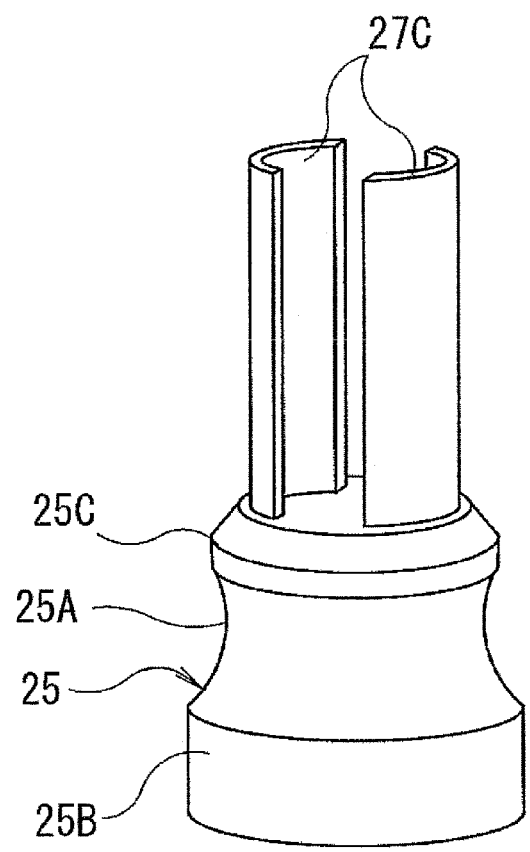
FIG. 6 is an explanatory view illustrating a modified example of the guide.
Figure 7:
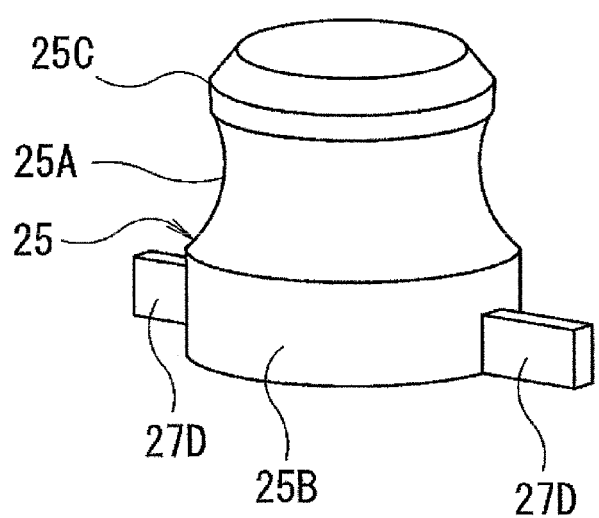
FIG. 7 is an explanatory view illustrating a modified example of the guide.

As illustrated in FIGS. 5 to 7, the present technology can also have a configuration including a guide 27 (27A to 27D) for moving the closing stopper 25 parallel to the flow channel 23 (the vertical hole section 23A).

In the example illustrated in FIG. 5, the guide 27 including a rod-shaped portion 27A integrally formed with the closing stopper 25 and a stopper 27B is provided. In FIG. 5, to make clear the combined structure including, in the flow channel 23, the closing stopper 25, the sealing member 26, the guide 27 (the rod-shaped portion 27A and the stopper 27B), the closing stopper 25 and the guide 27 (the rod-shaped portion 27A and the stopper 27B) are illustrated with a solid line and the flow channel 23 and the sealing member 26 are illustrated with a dashed line. The rod-shaped portion 27A is formed to protrude in the direction toward the inner side of the container from the center of the end surface of the inner portion 25C of the closing stopper 25. The stopper 27B is disposed on the inner side of the container with respect to the sealing member 26 and also serves as a stopper to prevent the sealing member 26 from falling off. A hole is provided in a center portion of the stopper 27B through which the rod-shaped portion 27A passes. When the closing stopper 25 begins to incline with respect to the flow channel 23 (the vertical hole section 23A), the rod-shaped portion 27A comes into contact with the inner surface of the hole of the stopper 27B, which makes it possible to prevent the closing stopper 25 from inclining. Note that provided that the rod-shaped portion 27A have a sufficient length even without the stopper 27B, when the closing stopper 25 begins to incline with respect to the flow channel 23 (the vertical hole section 23A), the rod-shaped portion 27A comes into contact with the inner wall surface of the flow channel 23 (the vertical hole section 23A), which makes it possible to suppress excessive inclination of the closing stopper 25.

In the example illustrated in FIG. 6, the guide 27 including arcuate plate-shaped portions 27C integrally formed with the end surface of the inner portion 25C of the closing stopper 25 is provided. The plate-shaped portions 27C are provided around the peripheral portion of the end surface of the inner portion 25C of the closing stopper 25. When the closing stopper 25 begins to incline with respect to the flow channel 23 (the vertical hole section 23A), these plate-shaped portions 27C come into contact with the sealing member 26 or the inner wall surface of the flow channel 23 (the vertical hole section 23A), thus preventing inclination of the closing stopper 25.

In the example illustrated in FIG. 7, the guide 27 including a plurality of protrusion portions 27D integrally formed with the side surface of the closing stopper 25 and grooves (not illustrated) formed in the inner wall surface of the vertical hole section 23A are provided. When two protrusion portions 27D are provided, the protrusion portions 27D are disposed, for example, at opposing locations as illustrated in FIG. 7. In this case, sliding the protrusion portions 27D in the grooves makes stable movement possible and can prevent the closing stopper 25 from inclining.

Although the pressure inside the container is approximately equal to atmospheric pressure at normal temperature, the pressure inside the container tends to increase depending on temperature conditions or the like (that is, higher temperatures) when the container is stored within the trunk or the like of the vehicle. It is thus necessary for the closing stopper 25 and the sealing member 26 to be engaged securely, even under conditions where the pressure inside the container is increased during storage. Accordingly, it is preferable that the closing stopper 25 be configured to be pushed out from the sealing member 26 and move within the flow channel 23 only upon the pressure inside the container reaching 150 kPa or higher. This configuration allows the flow channel 23 to be closed securely even if the pressure inside the container has changed due to a temperature change during storage and allows the flow channel 23 to be opened easily by the pressure of air supplied by a compressor during flat tire repair work.

Figure 8:
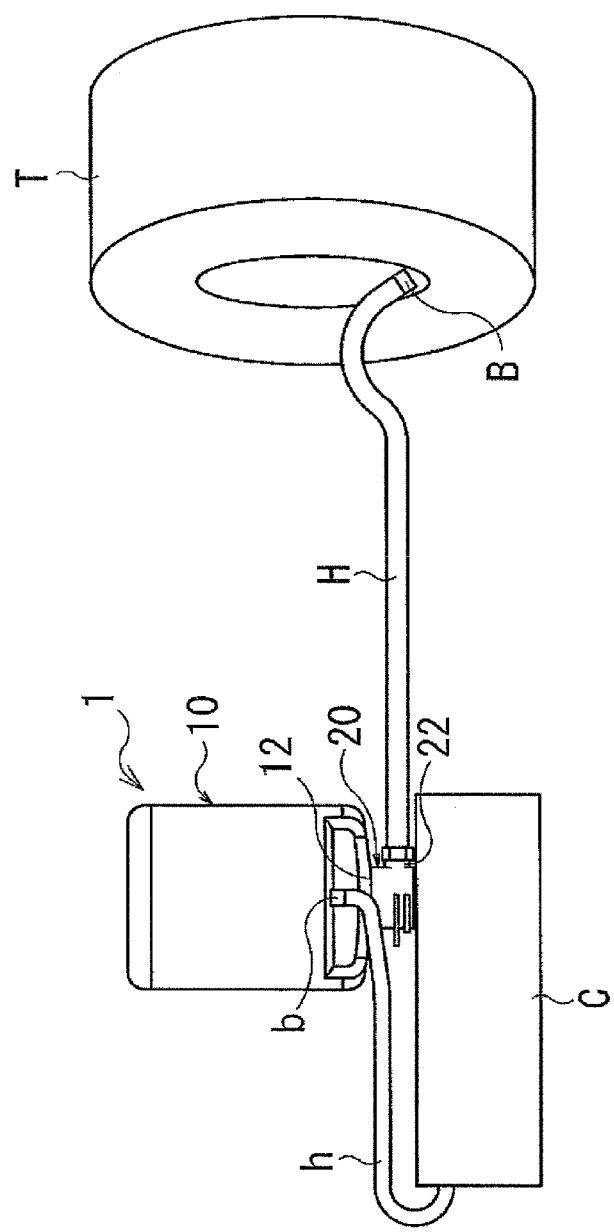
FIG. 8 is an explanatory view schematically illustrating the state of the flat tire repair liquid container according to the present technology which is in use.

A method for injecting the flat tire repair liquid (flat tire repair work) using the flat tire repair liquid container 1 constituted of the container main body 10 and the cap 20 will be described below. Note that FIG. 8 schematically illustrates a state of the flat tire repair liquid container 1 which is in use.

During flat tire repair work, the cap 20 is attached to the container main body 10. Note that in the case where a storage cap is already attached to the opening 12 of the container main body 10, the storage cap is replaced with the cap 20. At this time, in the case where a film covers the opening 12, the film is removed or broken. Meanwhile, one end portion of a hose H is fixed to the dispensing portion 22 of the cap 20 and the other end of the hose H is fixed to a valve B of a tire T, thus connecting the valve B of the tire T and the container 1. In addition, a compressor C is connected to the container 1 (in the case of FIG. 8, the compressor C is connected to a valve b provided in the container main body 10 by a hose h). Then, the container 1 connected to the tire T via the hose H is placed in an inverted state, with the opening 12 oriented downward (the state illustrated in FIG. 8), and the compressor C supplies air to the interior of the container main body 10. The pressure inside the container rises due to the supplied air, and when a predetermined pressure (preferably no lower than 150 kPa) is reached, the closing stopper 25 disengages from the sealing member 26. At this time, the closing stopper 25 moves within the flow channel 23 (the vertical hole section 23A) toward the outer side of the container, and the flow channel 23 opens (in other words, the state illustrated in FIG. 1 is reached). The repair liquid L is supplied from the container main body 10 through the opened flow channel 23, and is injected into the tire T via the dispensing portion 22 and the hose H. In this manner, all of the flat tire repair liquid L within the container 2 is injected into the tire T.

As such, the effects of employing the stopping mechanism constituted of the closing stopper 25 formed from a non-elastomer material, and the sealing member 26 formed from an elastomer material, or in other words, the effects of preventing liquid leakage effectively during storage and opening problems in the flow channel 23 can be achieved by this method for injecting the flat tire repair liquid (flat tire repair work) using the flat tire repair liquid container 1 according to the present technology.

The invention claimed is:

1. A flat tire repair liquid container comprising:
    a container main body including a container body and an opening, the container body storing a flat tire repair liquid;
    a cap including a mounting portion, a dispensing portion, and a flow channel, the mounting portion being mounted to the opening during flat tire repair work, the dispensing portion being configured to dispense the flat tire repair liquid outside of the container, the flow channel connecting the mounting portion and the dispensing portion;
    a closing stopper formed from a non-elastomer material, the closing stopper being capable of sliding within the flow channel; and
    a seal formed from an elastomer material, the seal being disposed in a ring shape conforming to an inner wall surface of the flow channel and configured to close a gap between the closing stopper and the flow channel and to hold the closing stopper at a predetermined position;
    wherein
    during storage, the closing stopper and the seal engage with one another to close the flow channel, and during flat tire repair work, the closing stopper is pushed out from the seal by pressure inside the container and moved toward an outer side of the container in the flow channel to open the flow channel.

2. The flat tire repair liquid container according to claim 1, wherein
    the closing stopper includes a recessed portion that engages with the seal,
    a diameter $R_A$ of the recessed portion is smaller than a diameter $R_B$ of an end of the closing stopper positioned toward the outer side of the container and a diameter $R_C$ of an end of the closing stopper positioned toward an inner side of the container, and
    the diameter $R_A$ is greater than an inner diameter r of the seal.

3. The flat tire repair liquid container according to claim 2, wherein the flow channel includes a vertical hole section extending in a sliding direction of the closing stopper and a horizontal hole section extending in a direction that intersects with the vertical hole section, and during flat tire repair work, the end of the closing stopper positioned toward the inner side of the container is located on the outer side of the container with respect to a center of the horizontal hole section.

4. The flat tire repair liquid container according to claim 3, wherein a housing portion that houses the closing stopper during flat tire repair work is provided on an end of the vertical hole section positioned toward the outer side of the container.

5. The flat tire repair liquid container according to claim 4, further comprising a guide for moving the closing stopper parallel to the flow channel.

6. The flat tire repair liquid container according to claim 5, wherein upon the pressure inside the container reaching 150 kPa or higher, the closing stopper is pushed out from the seal and moved toward the outer side of the container in the flow channel.

7. A method for injecting flat tire repair liquid using the flat tire repair liquid container described in claim 6, the method comprising the steps of:

connecting the flat tire repair liquid container to a compressor; and pressurizing an inside of the container to 150 kPa or higher such that the closing stopper is pushed out from the seal and moved toward the outer side of the container in the flow channel to open the flow channel.

8. The flat tire repair liquid container according to claim 1, wherein the flow channel includes a vertical hole section extending in a sliding direction of the closing stopper and a horizontal hole section extending in a direction that intersects with the vertical hole section, and during flat tire repair work, an end of the closing stopper positioned toward an inner side of the container is located on the outer side of the container with respect to a center of the horizontal hole section.

9. The flat tire repair liquid container according to claim 8, wherein a housing portion that houses the closing stopper during flat tire repair work is provided on an end of the vertical hole section positioned toward the outer side of the container.

10. The flat tire repair liquid container according to claim 1, further comprising a guide for moving the closing stopper parallel to the flow channel.

11. The flat tire repair liquid container according to claim 1, wherein upon the pressure inside the container reaching 150 kPa or higher, the closing stopper is pushed out from the seal and moved toward the outer side of the container in the flow channel.

12. A method for injecting flat tire repair liquid using the flat tire repair liquid container described in claim 1, the method comprising the steps of:

connecting the flat tire repair liquid container to a compressor; and pressurizing an inside of the container to 150 kPa or higher such that the closing stopper is pushed out from the seal and moved toward the outer side of the container in the flow channel to open the flow channel.

* * * * *